US012507321B2

(12) United States Patent
Kümpel et al.

(10) Patent No.: US 12,507,321 B2
(45) Date of Patent: Dec. 23, 2025

(54) PROCESS FOR MANUFACTURING A PTC HEATING ELEMENT AND PTC HEATING ELEMENT

(71) Applicant: Eberspächer catem Hermsdorf GmbH & Co. KG, Hermsdorf (DE)

(72) Inventors: Andreas Kümpel, Wünschensdorf/Elster (DE); Yves Knüpfer, Caaschwitz (DE)

(73) Assignee: EBERSPÄCHER CATEM HERMSDORF GMBH & CO. KG, Hermsdorf (DE)

( * ) Notice: Subject to any disclaimer, the term of this patent is extended or adjusted under 35 U.S.C. 154(b) by 1010 days.

(21) Appl. No.: 17/392,944

(22) Filed: Aug. 3, 2021

(65) Prior Publication Data

US 2022/0046765 A1 Feb. 10, 2022

(30) Foreign Application Priority Data

Aug. 4, 2020 (DE) ..................... 10 2020 120 472.8

(51) Int. Cl.
*B22F 7/00* (2006.01)
*F24H 3/04* (2022.01)
(Continued)

(52) U.S. Cl.
CPC ............. *H05B 3/30* (2013.01); *F24H 3/0452* (2013.01); *F24H 9/1872* (2013.01); *B22F 7/00* (2013.01);
(Continued)

(58) Field of Classification Search
CPC .......................................................... B22F 7/00
See application file for complete search history.

(56) References Cited

U.S. PATENT DOCUMENTS

2013/0048627 A1 2/2013 Satou

FOREIGN PATENT DOCUMENTS

CN 102970780 A 3/2013
CN 103228998 A 7/2013
(Continued)

OTHER PUBLICATIONS

English machine translation of WO 2012/025111 A2 of Bytzek (Year: 2012).*
(Continued)

*Primary Examiner* — Jophy S. Koshy
*Assistant Examiner* — Joshua S Carpenter
(74) *Attorney, Agent, or Firm* — McGlew and Tuttle, P.C.

(57) ABSTRACT

A process for manufacturing a PTC heating element that includes at least one PTC component (20) and a carrier (14, 16) permanently connected to the PTC component on at least one side (24, 26) of thereof The process includes applying electrically conductive sintered material (28, 30, 36, 38) on the one side of the PTC component, which side is to be permanently connected to a carrier. Subsequently, a contact of the PTC component is established with at least one carrier such that sintered material, which was applied between the PTC component and the carrier and is intended for establishing a connection between the at least one PTC component and the at least one carrier, is positioned. The sintered material, which material has been positioned between the PTC component and the carrier, is sintered by heating or/and by applying pressure.

19 Claims, 2 Drawing Sheets

(51) Int. Cl.
*F24H 9/1863* (2022.01)
*H05B 3/30* (2006.01)
*B60H 1/22* (2006.01)

(52) U.S. Cl.
CPC ...... *B60H 1/2225* (2013.01); *H05B 2203/017* (2013.01); *H05B 2203/02* (2013.01)

(56) References Cited

FOREIGN PATENT DOCUMENTS

| | | | | | |
|---|---|---|---|---|---|
| DE | 102010037132 | A1 | | 3/2012 | |
| EP | 0026457 | A2 | | 4/1981 | |
| WO | WO-2012025111 | A2 | * | 3/2012 | ........... B60H 1/2215 |
| WO | WO-2017110255 | A1 | * | 6/2017 | ................ B22F 1/00 |

OTHER PUBLICATIONS

English machine translation of WO 2017/110255 A1 of Hiramatsu (Year: 2017).*
German Patent Office office action in DE 10 2020 120 472.8 dated Jul. 4, 2025 (Year: 2025).*

* cited by examiner

PROCESS FOR MANUFACTURING A PTC HEATING ELEMENT AND PTC HEATING ELEMENT

CROSS REFERENCE TO RELATED APPLICATIONS

This application claims the benefit of priority under 35 U.S.C. § 119 of German Application 10 2020 120 472.8, filed Aug. 4, 2020, the entire contents of which are incorporated herein by reference.

TECHNICAL FIELD

The present invention pertains to a process for manufacturing a Positive Temperature Coefficient (PTC) heating element as well as to a PTC heating element manufactured, for example, with such a process.

TECHNICAL BACKGROUND

PTC heating elements are used in vehicle construction for heating gaseous or liquid media, for example, in order to transfer heat to the air to be introduced into the interior of a vehicle. The use of PTC heating elements is considered, above all, in purely electric motor-operated vehicles, in which other heat sources, for example, an internal combustion engine or a fuel-operated heater, are not available. Such PTC heating elements are also used in other areas, for example, for heating trains or for heating fuel cells.

SUMMARY

An object of the present invention is to provide a process for manufacturing a PTC heating element as well as a PTC heating element, with which process and PTC heating element an efficient heating operation of a PTC heating element is achieved along with the possibility of being able to carry out the manufacturing process in a simple and cost-effective manner.

This object is accomplished by a process for manufacturing a PTC heating element, wherein the PTC heating element comprises at least one PTC component and, on at least one side of the at least one PTC component, a carrier permanently connected to the at least one PTC component, the process comprising:

a) the application of electrically conductive sinter material (material that is sinterable) to a side of at least one PTC component, which side is to be permanently connected to a carrier, or/and to at least one carrier to be connected to the at least one PTC component, b) after carrying out step a), establishing of a contact of the at least one PTC component with at least one carrier such that sinter material, applied in step a) and intended for establishing a connection between the at least one PTC component and the at least one carrier, is positioned between the at least one PTC component and the at least one carrier, and c) sintering of the sinter material, positioned in step b) between the at least one PTC component and the at least one carrier, to provide sintered material (material that has been sintered) by heating or/and by applying pressure.

The procedure according to the present invention for manufacturing a PTC heating element combines different aspects which are especially advantageous for the manufacturing process, on the one hand, and for the operation of a PTC heating element thus manufactured, on the other hand. The use of an electrically conductive sinter material for establishing a permanent connection between one or more PTC components and at least one carrier for such PTC components creates the possibility of providing both the mechanical connection, i.e., also the electrically conductive connection by one and the same layer of material, namely, the sinter material, which is arranged between a respective PTC component and a carrier, and which is sintered at that location to harden upon sintering. Additional material layers, which could impair, above all, the heat dissipation and hence the heating efficiency, are not necessary. Further, the process according to the present invention utilizes the essential advantage that such electrically conductive sintered materials are, in general, very good heat conductors, so that it is possible not only to produce a permanent connection with a very small number of material layers positioned between a PTC component and a carrier, but, moreover, also to use for this a material that causes only a slight impairment in the heat transmission between a PTC component and a carrier, which material has, moreover, a high heat resistance. Another advantage is that no joining working steps to be carried out in a complicated manner are necessary for establishing the permanent connection between a PTC component and a carrier.

In order to obtain, on the one hand, the thinnest possible overall construction impairing the heat conduction out of the PTC heating element as little as possible and, on the other hand, in order to make it possible to guarantee a sufficient mechanical stability, it is proposed that the sinter material, which was applied in step a) to at least one side of the at least one PTC component or/and to at least one carrier and which is provided for establishing a connection between the at least one PTC component and the at least one carrier, be applied with a layer thickness of 5 μm to 20 μm and preferably about 10 μm. This means that when sinter material intended for establishing a connection between a side of a PTC component and the carrier to be connected to the PTC component on that side is applied both to one side of a PTC component and the carrier to be connected on that side to the PTC component, the thickness of the sinter material positioned between the PTC component and the carrier corresponds to twice the layer thickness, i.e., it is, for example, in the range of 10 μm to 40 μm and it preferably equals about 20 μm.

To provide a PTC component arranged in a sandwich-like manner (sandwiched) between two carriers and connected permanently to these, it is further proposed that sinter material provided for establishing a connection between the at least one PTC component and the at least one carrier be applied in step a) to two sides of the at least one PTC component, which said sides are oriented such that these sides face away from one another, or/and that sinter material intended for establishing a connection between the at least one PTC component and the at least one carrier be applied in step a) to two carriers to be connected to the at least one PTC component on two sides of the at least one PTC component, which said sides are oriented such that they face away from one another.

In order to make it possible to induce a PTC heating element to release heat during the heating operation, it is necessary to contact it electrically. Provisions may be made for this purpose for applying in step a) a sinter material intended for establishing a connection between the at least one PTC component and the at least one carrier to at least one carrier and preferably to two carriers on a side to be positioned such that it faces the at least one PTC component and for applying sinter material intended for providing at least one contact field on a side of said at least one carrier or of both carriers, which said side is to be positioned such that it faces away from the at least one PTC component, wherein at least one sintered material connection area is formed between the sintered material intended for establishing a connection between the at least one PTC component and this at least one carrier and the sinter material intended for providing at least one contact field, and for sintering in step c) the sinter material intended for providing at least one contact field and the at least one sintered material connection area by heating or/and by applying pressure.

Very efficient utilization of the heat released by a PTC component during electrical excitation can be achieved by this at least one carrier having a PTC component connection surface area on a carrier side to be positioned such that it faces the at least one PTC component, wherein this at least one carrier is to be connected in the PTC component connection surface area to the at least one PTC component by the sinter material, which was applied in step a) and which is intended for establishing a connection between the at least one PTC component and this at least one carrier, by this at least one carrier having at least one contact field surface area on a carrier side to be positioned such that it faces away from the at least one PTC component, wherein at least one contact field is to be formed in the at least one contact field surface area by the sinter material applied in step a) for providing at least one contact field, and by the at least one contact field surface area and the PTC component connection surface area not overlapping in at least some areas and preferably not overlapping completely. Thus, the at least one contact field surface area intended for the electrical contacting does not overlap or cover the area of the PTC component in which this is connected by sintered material to one or more carriers, and thus it does not impair the release of heat from the PTC component to a medium to be heated.

In order to make it possible to guarantee a uniform and full-surface coating of a PTC component or of a carrier and hence a correspondingly uniform and full-surface connection between these, it is proposed that the sinter material be applied in step a) by screen printing. It should be noted that screen printing is advantageous as an especially simple procedure, which is also carried out precisely, for applying free-flowing, for example, pasty material. Other procedures for applying such free-flowing, for example, pasty material, for example, the application of this material to a surface to be coated and the distribution of the free-flowing material on said surface by means of a doctor blade or of such a tool, may be employed as well.

High mechanical stability along with good electrical and thermal conductivity can be guaranteed, for example, by the sinter material applied in step a) containing metallic material. The use of metallic material containing silver or/and platinum has proved to be especially advantageous.

The sinter material can be brought to a temperature in the range of 200° C. to 300° C. and preferably about 250° C. especially if the sinter material comprises metallic material containing silver and/or platinum. Carrying out the sintering process at such a comparatively low temperature ensures that a structural change brought about by an excessive heating in the material forming a PTC component, which change could impair the ability of this material to function, is avoided.

For a flat contact between one or more PTC components, the at least one carrier may have a plate-like (plate shape) configuration. In order to make it possible to provide such a carrier itself as an electrical insulator, but also as a good heat conductor, it is further proposed that the at least one carrier be made of a ceramic material. For example, such a carrier may be made of aluminum oxide ($Al_2O_3$).

In order to make it possible to achieve an essentially complete encapsulation of the at least one PTC component, it is further proposed that the at least one PTC component be arranged in step b) between two carriers to be connected to said PTC component with sinter material, which is positioned between them and is intended for establishing a connection between the at least one PTC component and a respective carrier of the two carriers, such that the at least one PTC component is enclosed at least partially by a frame arranged between the two carriers, wherein the material thickness of the frame is not greater and preferably smaller than a thickness of the at least one PTC component. Since the material thickness of the frame, measured in a direction between the carriers accommodating the frame between them, is at least not greater than the thickness of a PTC component, which thickness is measured between the two carriers, it is achieved that the positioning of the two carriers, which positioning accommodates such a PTC component between the carriers, and hence also the strength of the connection to the PTC component, are not compromised by the frame arranged between the carriers.

For a manufacturing process that can be carried out in a simple manner, the frame may be connected to one of the two carriers to be connected to the at least one PTC component before the PTC component is arranged between the two carriers.

The object mentioned in the introduction is accomplished, further, by a PTC heating element, comprising at least one PTC component and a carrier connected to same permanently by electrically conductive sintered material on at least one side, preferably on two sides of the at least one PTC component, which said sides are oriented such that they face away from one another.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
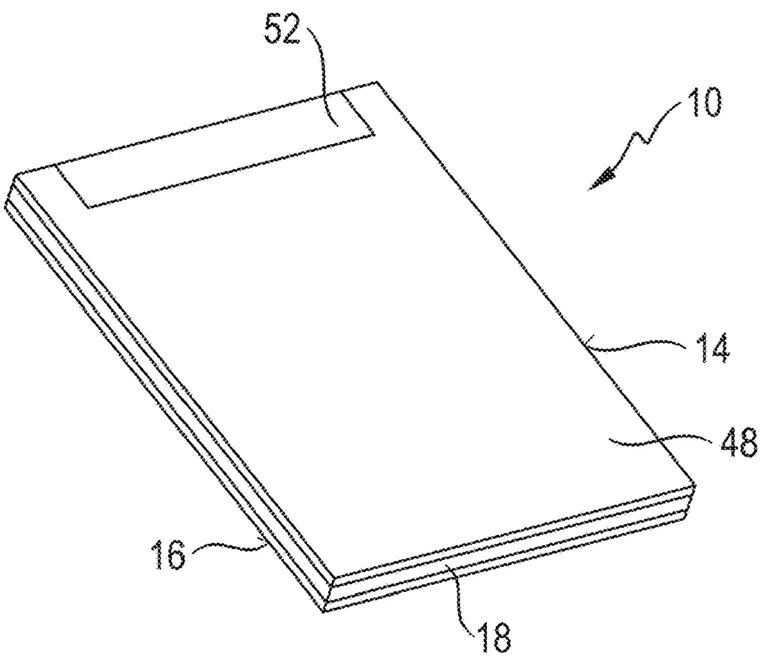
FIG. 1 is a perspective view showing a PTC heating element in a perspective view.
Figure 2:
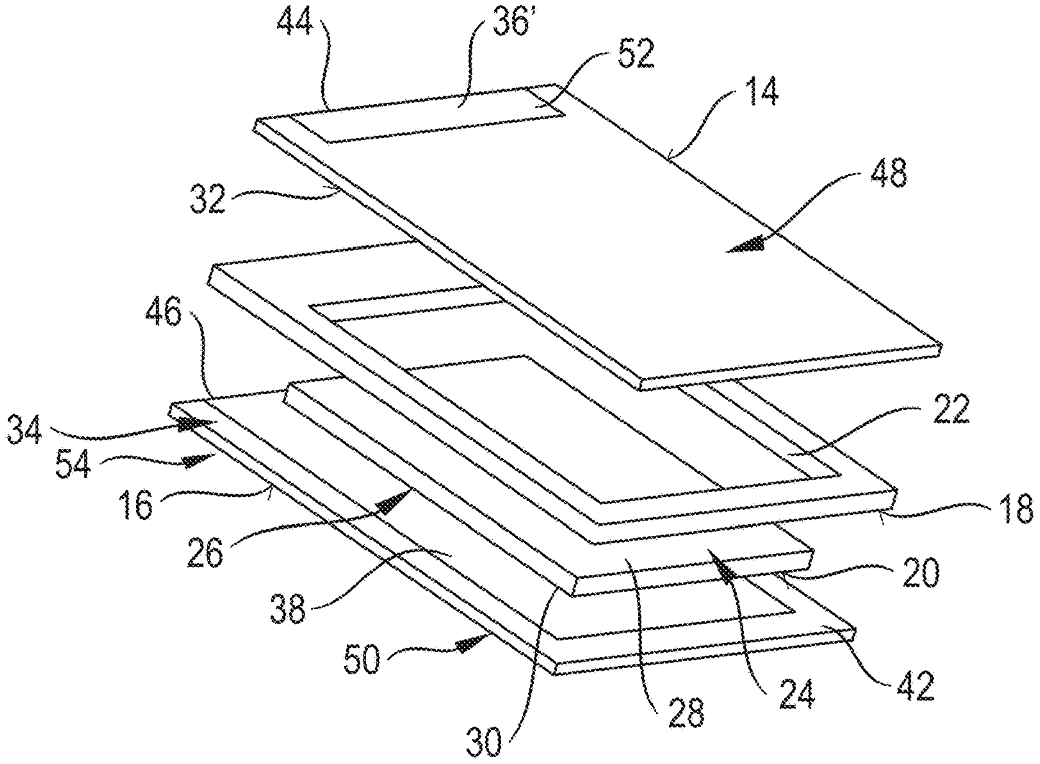
FIG. 2 is an exploded perspective view showing the PTC heating element according to FIG. 1.

Referring to the drawings, FIG. 1 shows in a perspective view a PTC heating element 10, which may be used in various systems to be heated, for example, electric motor-operated vehicles, trains, fuel cells or the like. The PTC heating element 10, which has an essentially plate-like (plate shape) configuration and is shown in an exploded view in FIG. 2, is built with two plate-like carriers 14, 16. The two plate-like carriers 14, 16 are made, for example, of a ceramic material, e.g., aluminum oxide. The PTC component 20, is enclosed by a frame 18. The PTC component is made, for example, likewise of a ceramic material, e.g., aluminum oxide, and which generates heat on electrical excitation and which likewise has, for example, a plate-like shape, is arranged between these two plate-like carriers 14, 16. The frame 18 has an opening 22 adapted to the outer circumferential contour and to the external dimension of the PTC component 20. The frame 18 is preferably shaped and dimensioned in its frame outer circumferential area such that the frame 18 closes essentially flush in the assembled state together with the two carriers 14, 16 arranged on both sides of it, i.e., the frame 18 does not project to the outside nor is the frame 18 set back.

To establish a permanent connection between the PTC component 20 and the two carriers 14, 16, which connection also allows an electrical contacting, metal-containing sinter material, i.e., for example, sinter material containing silver or/and platinum, is used in the manner described below. The PTC component 20 is coated with free-flowing, for example, pasty sinter material 28, 30 on its two sides 24, 26, which are oriented such that the two sides 24, 26 face away from one another and are each to be connected to one of the respective carriers 14, 16. This may be carried out, for example, in a screen printing process or with the use of a doctor blade or of such a tool, so that the entire side 24, 26 to be connected to one of the carriers 14, 16 is coated essentially with the sinter material 28, 30.

Figure 3:
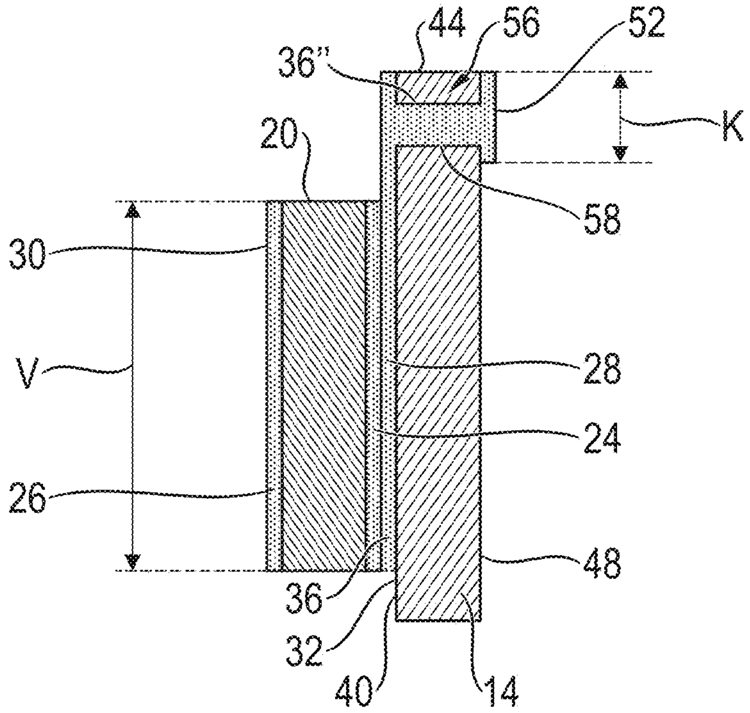
FIG. 3 is a longitudinal sectional view of a PTC component connected to a carrier by sintered material.

Each of the two carriers 14, 16 is likewise coated with sinter material 36, 38 on its carrier side 32, 34 that is to be positioned such that it faces the PTC component 20 and is to be connected thereto. A PTC component connection surface area V shown in conjunction with the carrier 14 in FIG. 3, in which area these carriers 14, 16 are to be connected to the PTC component 20, is essentially coated here. An edge area 40, 42 of the carriers 14, 16, which edge area 40, 42 is covered essentially by the frame 18, remains free, i.e., uncoated, on three sides of the carriers 14, 16 in the exemplary embodiment shown. In one part of the edge areas 40, 42, the sinter material applied to the carriers 14, 16 is pulled beyond the PTC component connection surface area V, for example, into the area of a respective end face 44, 46 of the carriers 14, 16. Sinter material 36' is also applied in this part of the edge areas 40, 42 of the carriers 14, 16 on the sides 48, 50 of the carriers 14, 16, which sides are to be positioned such that they face away from the PTC component 20, in order to form a contact field 52, 54 for establishing an electrical contacting of the PTC component 20 in a contact field surface area K. This is shown in FIG. 3 in connection with the contact field 52 to be formed at the carrier 14. A corresponding configuration may also be embodied in connection with the carrier 16 not shown in FIG. 3.

In order to establish a connection between the sinter material 36, 36' provided on the two sides 32, 48 and 34, 50 of the carriers 14, 16, a sintered material connection area 56, which can be seen in FIG. 3 in connection with the carrier 14, is provided. This sintered material connection area may be formed, for example, by a plurality of openings 58, which are filled with sinter material 36". These openings 58 are provided in a respective carrier 14, 16, so that a bond is formed between the respective sinter material 36 and 38, provided on the respective sides 32 and 34 to be positioned such that they face the PTC component 20, and the sinter material 36' intended for providing a respective contact field 52, 54 on the respective sides 48, 50 of the carriers 14, 16, which said sides 48, 50 are to be positioned such that they face away from the PTC component. A uniform bond of the sintered material is thus formed at each of the carriers 14, 16.

Figure 4A:
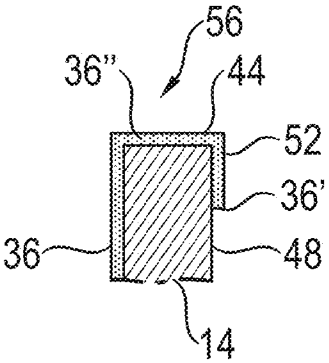
FIG. 4*a* is a partial sectional view showing an alternative embodiment of a contact field.
Figure 4B:
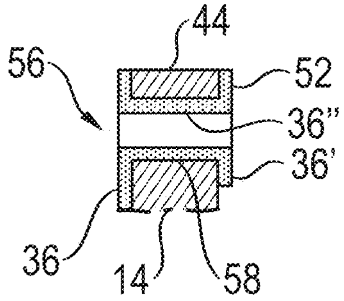
FIG. 4*b* is a partial sectional view showing another alternative embodiment of a contact field.

Alternative embodiments for the sintered material connection area 56 are shown in FIGS. 4*a* and 4*b*. FIG. 4*a* shows the provision of the sintered material connection area 56 with sintered material 36" pulled beyond the end face 44 of the carrier 14, so that the sintered material 36, 36", 36' provided at the carrier 14 encloses the carrier 14 in the area of its end face 44 in a U-shaped manner for providing the contact field 52 in the contact field surface area K. FIG. 4*b* shows an embodiment corresponding to the configuration according to FIG. 3, in which the sinter material 36" of the sintered material connection area 56 is provided in the openings 58, but this sinter material 36" only wets the surface openings 58 and thus this sinter material 36" does not fill these completely.

Each of the two carriers 14, 16 may be configured as shown in FIGS. 3 and 4*a*, 4*b*, for providing a respective sintered material connection area 56, and the two carriers 14, 16 may preferably have an identical configuration concerning the configuration of the sintered material connection areas 56. The sintered material connection areas 56 of the two carriers 14, 16 could, in principle, have mutually different configurations.

After the PTC component 20 has been coated on its two component sides 24, 26 with the sinter material 28, 30 and the two carriers 14, 16 have been coated with sinter material in their respective PTC component surface area V, in their contact field surface area K and in the area connecting these two surface areas, the frame 18 can be connected permanently, for example, to one of the two carriers 14, 16, for example, by bonding or the like in the part of the respective edge area 40, 42 which is not coated with the sinter material 36, 38. The PTC component 20 coated with the sinter material 28, 30 on its two sides 24, 26 can then be placed onto this carrier/frame assembly and inserted into the opening 22 of the frame 18, so that the PTC component 20 with the sinter material 28, 30 provided on one of its two sides comes into contact with the sinter material 36 or 38 provided in the PTC component connection surface area V on the carrier 14 or 16 already connected to the frame 18. The other of the two carriers 14, 16 is then put on such that the sandwich-like assembly shown in FIG. 1 is obtained and the sinter material 36 or 38 provided in the PTC component connection surface area V thereof comes into connection with the sinter material 24 or 26 provided on the still exposed side 24 or 26 of the PTC component 20. To achieve a coating leading to a full-surface and stable connection contact in the process, the frame 18 is built with a thickness, measured between the two carriers 14, 16, which is at least not greater than the thickness of the material of the uncoated PTC component 20, and it is preferably smaller than this material thickness.

After achieving this sandwich-like (sandwich) layering of the two carriers 14, 16 and of the PTC component 20 enclosed by the frame 18, the sinter material 36, 36', 36" and 38 is sintered by heating to form the sintered material 36, 36', 36" and 38 . A pressure supporting the sintering process may optionally be applied, for example, by loading the two carriers 14, 16 towards one another. It is sufficient due to the advantageous use of sinter material containing silver or/and platinum if heating to a temperature in the range of about 250° C. is carried out during the performance of the sintering process. This ensures, on the one hand, that the respective sinter material 36, 36', 36", 38, 28, 30 provided on the carriers 14, 16 and on the PTC component 20 will form a stable connection, but it does, on the other hand, also avoid a structural transformation as the sinter material is sintered to form sintered material. Such a structural transformation is caused by excessive heating and possibly compromises the functionality of the PTC component 20, in the interior of the PTC component 20.

After carrying out the sintering process and after cooling the PTC heating element 10 thus manufactured, a gap-like (gap) intermediate space that may possibly still be present between one or both of the carriers 14, 16, on the one hand, and the frame 18, on the other hand, may be sealed, for example, if the PTC heating element 10 will be used in conjunction with a liquid that is to be heated.

The above-described process for manufacturing the PTC heating element leads in a process, which can be carried out in a simple manner, to a configuration of the PTC heating element 10, which has a simple structure, and in which only a comparatively thin coating with sintered material is to be provided for establishing the mechanical connection and the electrically conductive connection between the PTC component and the two carriers 14, 16 to be provided on this. The thickness of this coating may be about 10 μm, so that the total thickness of the layer of sintered material establishing the connection is also comparatively thin even if such a coating with sintered material 36, 28 and 38, 30 is provided on each of the carriers 14, 16 and on the respective associated side 24, 26 of the PTC component 20. The carriers 14, 16, which are preferably made of a ceramic material, are also good heat conductors contributing to a high efficiency.

Another essential advantage of the PTC heating element 10 manufactured with the procedure according to the present invention is that, as is shown in FIG. 3, the PTC component is positioned in relation to the two carriers 14, 16 such that the PTC component connection surface area V does not overlap with the respective contact field surface area K. This means that the PTC component 20 also does not overlap in the PTC heating element 10 with the contact fields 52, 54, and it is preferably at a spaced location thereto. This offers the possibility of utilizing the entire area of the areas 14, 16 that is in connection with the PTC component 20 for the transfer of heat to a medium to be heated. This avoids, on the one hand, the development of a heat build-up in the interior of the sandwich-like construction, and, on the other hand, this leads to a high efficiency of a PTC heating element having such a configuration, because dissipation of heat into areas that are not actually used to heat a medium to be heated is ruled out to the greatest extent possible. A contribution is also made to a high efficiency by the fact that the material used to establish the electrically conductive connection and the mechanical connection is or contains metallic material and thus has a high thermal conductivity and a low heat conduction resistance, and that, as was described above, the material establishing the connection is additionally also very thin.

It should be noted that different variations are also possible in the above-described procedure for manufacturing a PTC heating element. It is thus possible, for example, that a plurality of PTC components are arranged between two carriers with the above-described procedure. For example, the frame may have for this purpose an opening receiving the PTC component in association with each PTC component to be provided between the two carriers. Further, provisions could be made for the two contact fields to be provided for establishing an electrical contacting of the PTC component to be provided at one of the two carriers, while no such contact field is present at the other carrier. For example, the two contact fields could be provided on the short sides of one of the two carriers configured with a rectangular circumferential contour, which said short sides are located at spaced locations from one another. In order to avoid now an electrical short circuit through the sintered material (already sintered material) providing such contact fields at one of the two carriers, this sintered material (already sintered material) may have an interruption in a length area between the two contact fields in the PTC component connection surface area, so that a flow of current through the PTC component is forced. In another alternative procedure, it would be possible, for example, to make provisions for a coating with sintered material to be carried out only in the area of the carriers, and for the PTC component to be connected to this to be then placed during the sintering process on the sinter material provided on the carrier with its side that is to be positioned such that it faces a respective carrier.

While specific embodiments of the invention have been shown and described in detail to illustrate the application of the principles of the invention, it will be understood that the invention may be embodied otherwise without departing from such principles.

What is claimed is:

1. A process for manufacturing a Positive Thermal Coefficient (PTC) heating element, wherein the PTC heating element comprises at least one PTC component and, on each side of two sides of the at least one PTC component facing away from one another, a carrier permanently connected to the at least one PTC component, wherein the process comprises the steps of:

applying electrically conductive sinter material to each one of the carriers to be connected to the at least one PTC component or applying electrically conductive sinter material to both each side of the two sides of the at least one PTC component facing away from one another and to each one of the carriers;

subsequent to carrying out the step of applying electrically conductive sinter material, positioning the at least one PTC component and a frame completely enclosing the at least one PTC component between the carriers and establishing a contact of the at least one PTC component with each one of the carriers such that sinter material applied in the step of applying electrically conductive sinter material is positioned between the at least one PTC component and each one of the carriers, said frame having a material thickness that is not greater than a thickness of the at least one PTC component and closing flush along its entire outer circumference with each one of the carriers arranged on both sides thereof, such that the frame does not project to the outside and is not a set back with respect to each one of the carriers arranged on both sides thereof; and sintering the sinter material positioned between the at least one PTC component and each one of the carriers to provide sintered material by heating or by applying pressure or by both heating and by applying pressure to the sinter material positioned between the at least one PTC component and the carrier;

wherein:

the step of applying electrically conductive sinter material to the carriers comprises applying sinter material on each one of the carriers on a side thereof to be positioned facing the at least one PTC component and applying sinter material on each one of the carriers on a side thereof to be positioned facing away from the at least one PTC component for forming, at each one of the carriers, at least one contact field on the side thereof to be positioned facing away from the at least one PTC component;

at each one of the carriers, at least one sintered material connection area is to be formed with sinter material applied in the step of applying electrically conductive sinter material to the carriers between the sinter material applied on the side thereof to be positioned facing the at least one PTC component and the sinter material applied on the side thereof to be positioned facing away from the at least one PTC component; and at each one of the carriers, said sinter material intended for providing the at least one contact field and the sinter material intended for providing the at least one sintered material connection area are sintered in the step of sintering the sinter material.

2. The process in accordance with claim 1, wherein the sinter material is applied with a layer thickness of 5 μm to 20 μm.

3. The process in accordance with claim 1, wherein:

each one of the carriers has a PTC component connection surface area on the side thereof to be positioned facing the at least one PTC component;

each one of the carriers is to be connected in the PTC component connection surface area thereof to the at least one PTC component by the sinter material applied in the step of applying electrically conductive sinter material for establishing a connection between the at least one PTC component and each one of the carriers;

each one of the carriers has at least one contact field surface area on the side thereof to be positioned facing away from the at least one PTC component;

at each one of the carriers, the at least one contact field is formed in the at least one contact field surface area by the applied sinter material being sintered to provide the at least one contact field; and at each one of the carriers, the contact field surface area does not overlap the PTC component connection surface area at least in some areas.

4. The process in accordance with claim 1, wherein the sinter material is applied by screen printing in the step of applying electrically conductive sinter material.

5. The process in accordance with claim 1, wherein the sinter material comprises metallic material.

6. The process in accordance with claim 1, wherein sintering the sinter material comprises heating the sinter material to a temperature in the range of 200° C. to 300° C.

7. The process in accordance with claim 1, wherein:

each one of the carriers has a plate shape configuration; or each one of the carriers is made of ceramic material; or each one of the carriers has a plate shape configuration and is made of ceramic material.

8. The process in accordance with claim 1, wherein the frame is connected to one of the carriers prior to the arrangement of the at least one PTC component between the carriers.

9. The process in accordance with claim 5, wherein the metallic material comprises silver and/or platinum.

10. A process for manufacturing a Positive Thermal Coefficient (PTC) heating element, wherein the PTC heating element comprises at least one PTC component and, on each side of two sides of the at least one PTC component facing away from one another, a carrier permanently connected to the at least one PTC component, the process comprising:

applying electrically conductive sinter material to each one of the carriers to be connected to the at least one PTC component or applying electrically conductive sinter material to each side of the two sides of the at least one PTC component facing away from one another and to each one of the carriers;

positioning the at least one PTC component and a frame between the carriers and establishing a contact of the at least one PTC component with each one of the carriers after applying electrically conductive sinter material such that sinter material applied in the step of applying electrically conductive sinter material is positioned between the at least one PTC component and each one of the carriers, said frame extending completely about an entire perimeter of the at least one PTC component, the frame having a frame material thickness, the at least one PTC component having a PTC component thickness, the frame material thickness being less than the PTC component thickness, the frame closing flush along its entire outer circumference with each one of the carriers arranged on both sides thereof, such that the frame does not extend beyond each one of the carriers; and sintering the sinter material positioned between the at least one PTC component and each one of the carriers to provide sintered material by heating or by applying pressure or by both heating and by applying pressure to the sinter material positioned between the at least one PTC component and the carrier.

11. The process in accordance with claim 10, wherein:

the step of applying electrically conductive sinter material to the carriers comprises applying sinter material on each one of the carriers on a side thereof to be positioned facing the at least one PTC component and applying sinter material on each one of the carriers on a side thereof to be positioned facing away from the at least one PTC component for forming, at each one of the carriers, at least one contact field on the side thereof to be positioned facing away from the at least one PTC component;

at each one of the carriers, at least one sintered material connection area is to be formed with sinter material applied in the step of applying electrically conductive sinter material to the carriers between the sinter material applied on the side thereof to be positioned facing the at least one PTC component and the sinter material applied on the side thereof to be positioned facing away from the at least one PTC component; and at each one of the carriers, said sinter material intended for providing the at least one contact field and the sinter material intended for providing the at least one sintered material connection area are sintered in the step of sintering the sinter material.

12. The process in accordance with claim 11, wherein the sinter material is applied with a layer thickness of 5 m to 20 m.

13. The process in accordance with claim 11, wherein:

each one of the carriers has a PTC component connection surface area on the side thereof to be positioned facing the at least one PTC component;

each one of the carriers is to be connected in the PTC component connection surface area thereof to the at least one PTC component by the sinter material applied in the step of applying electrically conductive sinter material for establishing a connection between the at least one PTC component and each one of the carriers;

each one of the carriers has at least one contact field surface area on the side thereof to be positioned facing away from the at least one PTC component;

at each one of the carriers, the at least one contact field is formed in the at least one contact field surface area by the applied sinter material being sintered to provide the at least one contact field; and at each one of the carriers, the contact field surface area does not overlap the PTC component connection surface area at least in some areas.

14. The process in accordance with claim 11, wherein the sinter material is applied by screen printing in the step of applying electrically conductive sinter material.

15. The process in accordance with claim 11, wherein the sinter material comprises metallic material.

16. The process in accordance with claim 11, wherein sintering the sinter material comprises heating the sinter material to a temperature in the range of 200° C. to 300° C.

17. The process in accordance with claim 11, wherein:

each one of the carriers has a plate shape configuration; or each one of the carriers is made of ceramic material; or each one of the carriers has a plate shape configuration and is made of ceramic material.

18. The process in accordance with claim 11, wherein the frame is connected to one of the carriers prior to the arrangement of the at least one PTC component between the carriers.

19. The process in accordance with claim 15, wherein the metallic material comprises silver and/or platinum.

* * * * *